INVENTOR.
JAMES A. HARDMAN
BY M. Ralph Shaffer
HIS ATTORNEY.

Oct. 1, 1963  J. A. HARDMAN  3,105,700
THREE WHEEL-AXIS SUSPENSION SYSTEM
Filed April 24, 1961  3 Sheets-Sheet 2
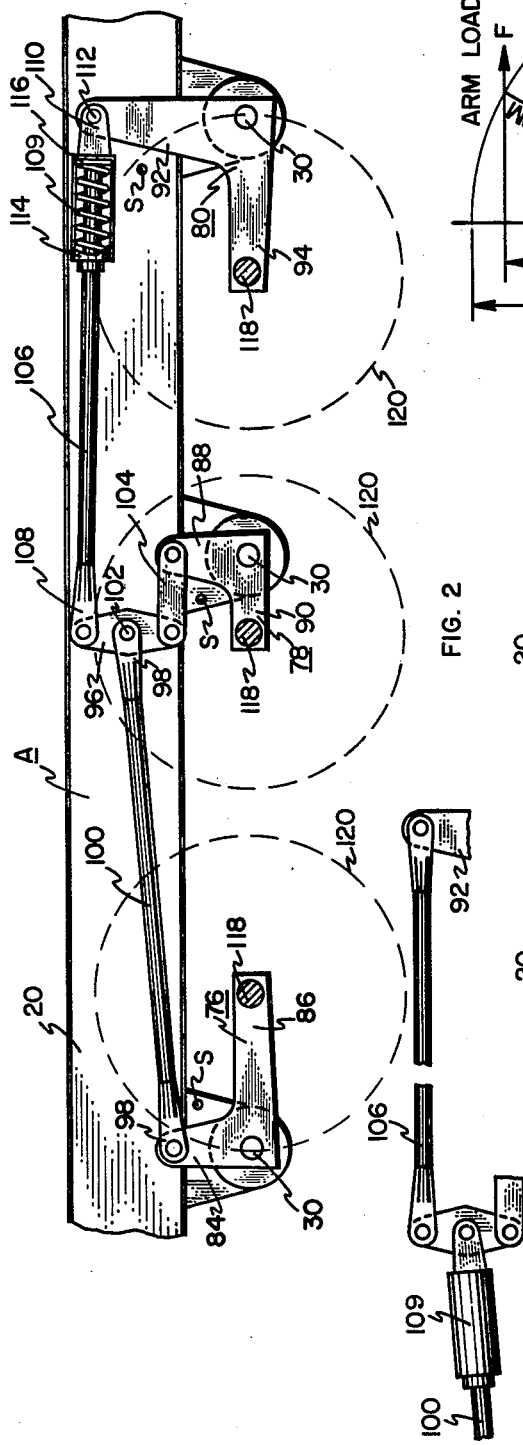
FIG. 2
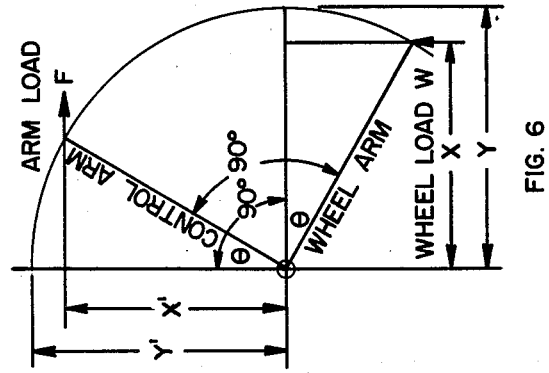
FIG. 6
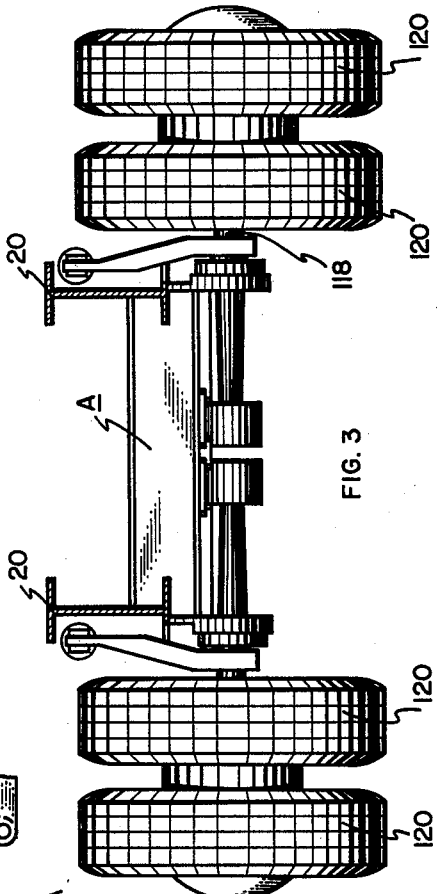
FIG. 3
FIG. 2A
*INVENTOR.*
JAMES A. HARDMAN
BY
HIS ATTORNEY Oct. 1, 1963  J. A. HARDMAN  3,105,700
THREE WHEEL-AXIS SUSPENSION SYSTEM
Filed April 24, 1961  3 Sheets-Sheet 3
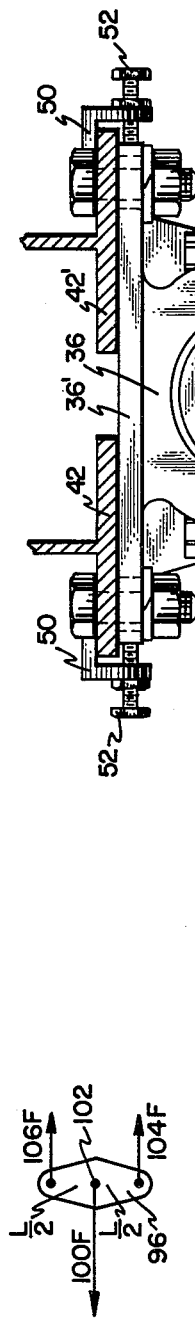
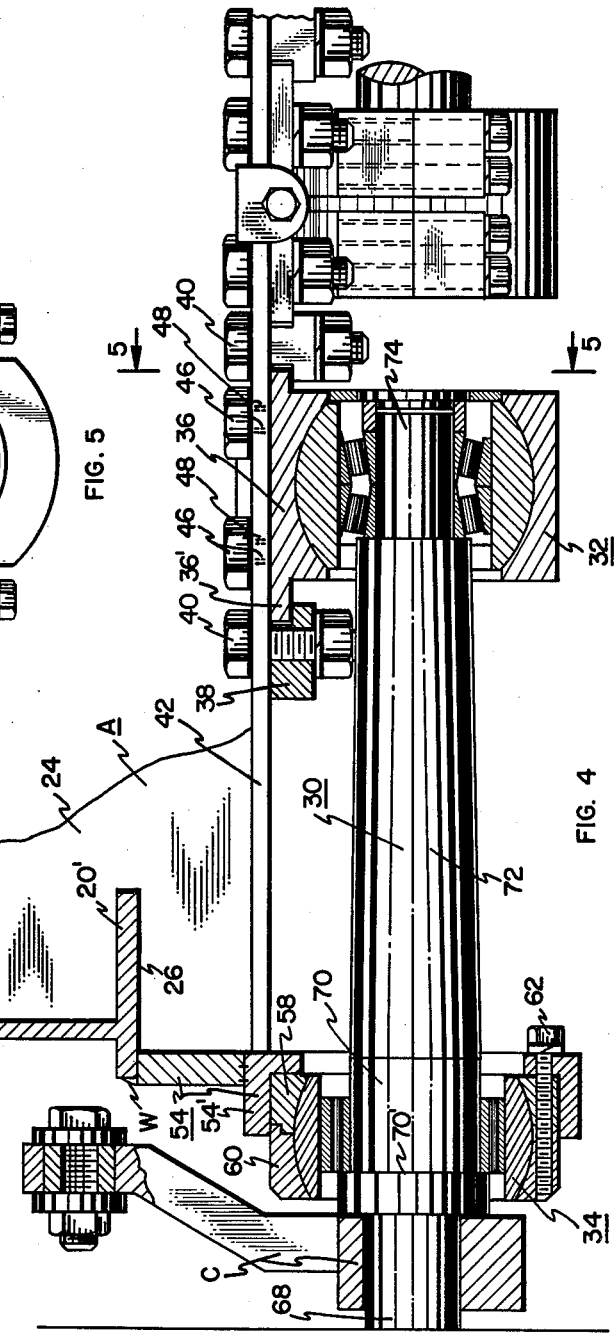
INVENTOR.
JAMES A. HARDMAN
BY
HIS ATTORNEY

United States Patent Office 3,105,700
Patented Oct. 1, 1963

3,105,700
THREE WHEEL-AXIS SUSPENSION SYSTEM
James A. Hardman, Logan, Utah
Filed Apr. 24, 1961, Ser. No. 104,915
4 Claims. (Cl. 280—104.5)

The present invention relates to suspension systems and, more particularly, to one to be utilized on trailers wherein the duplicate wheel suspensions on opposite sides of the frame combine with the fifth wheel connection thereof so as to assure a three-point, evenly distributed, support contact.

One of the objects of the present invention is to provide a wheel axis suspension for trailers which will approach equal pressure on the wheels while traveling over rough terrain or when the trailer is positioned at a sharp angle such as occurs when it is being drawn up or down a ramp.

Another object of the invention is to provide a wheel suspension system wherein the movement of the wheels is substantially in a vertical plane. This eliminates side scrub encountered by other types of suspensions.

A further object is to arrange the wheel suspensions so that an equal upward pressure is being imposed on the trailer regardless of the wheel displacement, thus obtaining substantially equal load distribution on each axle.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 2 is a fragmentary, side elevation of the trailer of FIGURE 1 and partially shown in schematic form to illustrate the operating principles thereof.

FIGURE 2A is a fragmentary, partial view of a portion of alternate linkage which may be incorporated in the structure of FIGURE 2.

FIGURE 3 is an end elevation of the trailer of FIGURES 1 and 2.

FIGURE 4 is an enlarged, sectional view taken along the line 4—4 in FIGURE 1 and illustrates the journals and their mounting for the pivot axles of the structure.

FIGURE 5 is a section taken along the lines 5—5 in FIGURE 4.

FIGURE 6 is a diagram of wheel load and arm load relating to the wheel bell cranks for various dispositions thereof.

FIGURE 6A is a simplified vector diagram relating to forces imposed upon one element in the wheel linkage of the present invention.

Figure 1:
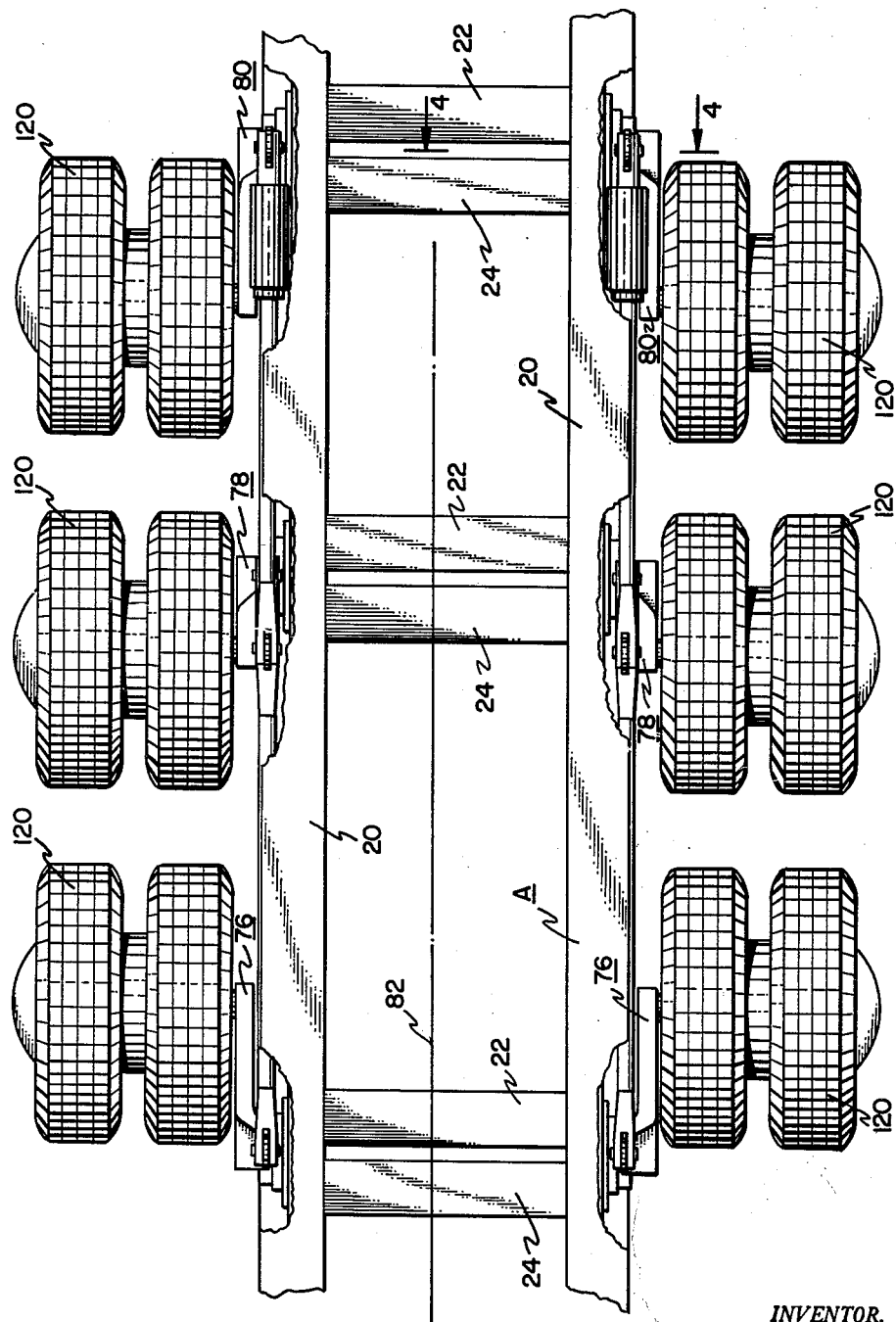
FIGURE 1 is a fragmentary, partially cut-away plan view of a trailer incorporating the suspension system of the present invention, the conventional fifth wheel connection, generally a king pin, of the trailer not being shown, for convenience of illustration.

In the drawings the chassis or frame A comprises a plurality of longitudinal members 20 which have slightly modified lower web members as hereinafter described. The longitudinal members 20 are interconnected by a plurality of I-beam transverse members 22 and 24 arranged in spaced pairs as seen in FIGURE 1. As shown in FIGURES 1, 3 and 4, the longitudinal and transverse members are welded together into a rigid chassis structure, with the lower inner flange 20′ (see FIGURE 4) of the longitudinal members 20 extending into slotted portions 26 of their respective transverse members intermediate the top and bottom flanges thereof whereby approximately one-half of the transverse member depends below the lower flanges of the longitudinal members.

The spaced transverse chassis members 22 and 24 support the journals for the six pivot axles 30 of the wheel bell cranks, hereinafter described. As shown in FIGURE 4, each axle 30 is supported at its inner end by an inner bearing 32 and at its outer end by an outer bearing 34, both preferably being self-aligning bearings as illustrated. The inner bearing 32, a pillow block bearing which, by its tapered outer races, also serves as a thrust bearing (see FIGURE 4), has a pillow block 36 and a mounting flange 38 securing the same to frame A by means of bolt attachments 40. The pillow block 36 is provided with flanges 36′ which underlie and span the bottom flange members of the transverse chassis members 22 and 24, and are supported thereon by securing bolts 46. I-beam flanges 42 and 42′ of transverse members 22 and 24 have enlarged openings 48 through which the securing bolts 46 extend, the enlarged openings permitting the inner bearing member 32 to be adjusted for purposes of properly aligning axle member 30. This may be accomplished as shown in FIGURE 5 by securing, as by welding, to the flanges 42 and 42′ a pair of depending L-brackets 50 each carrying a micrometer screw 52 which engages the edge of the flange 36′ of pillow block 36 for properly positioning it.

The outer bearing 34 is supported within a holder 54, which, as best seen from FIGURE 4, is welded at W to the edge of the modified shortened outer flange of the longitudinal I-beam 20 and also to the vertical and transverse flanges of the I-beams 22 and 24. The lower portion of the holder 54 has an integral cylindrical seat 54′ to receive the base member 58 of the outer bearing 34. The outer bearing further includes a cap member 60 which is secured to the base member 58 and the holder 54 by suitable cap bolts 62. As clearly seen, each bearing housing is of spherical shape to receive self-aligning spherical bearings. The bearings are preferably designed to be of the pillow block type to provide maximum carrying capacity.

Each axle 30 has an outer reduced end portion 68 on which the wheel carrier means C is supported, an outer journal portion 70 and shoulder 70′, a central tapered portion 72 and an inner journal portion 74.

Pivot axles 30 are integral with wheel carriers C to comprise front, medial, and rear composite bell cranks 76, 78 and 80, respectively, and are coaxially aligned as to respective pairs to define the three axes about which opposite wheels pivot during travel. As shown in FIGURE 1, a set of these bell cranks is disposed on both sides of the central longitudinal axis 82 of frame A. In addition to pivot axle 30, each bell crank 76 includes control arm 84 and wheel arm 86 (see FIGURE 2). Each bell crank 78 includes control arm 88, wheel arm 90 and its respective pivot axle 30. Each bell crank 80 includes control arm 92, wheel arm 94 and its respective pivot axle 30. The respective control arms and wheel arms of the several bell cranks must be related in quadrature, that is, of the order of 90° removed from each other. The necessity of this limitation will be readily apparent when reference is made to the diagram of FIGURE 6. Also, and for proper operation, points of connection to arms 84 and 86 must be such that the effective length of control arm 84 (i.e. about the axis of pivot axle 30) to the effective length of wheel arm 86 about the same axis is of the ratio of one to two. Likewise, where toggle 96, hereinafter to be described, is fulcrumed at its effective center, then the ratio of the effective lengths of the control and wheel arms of the remaining bell cranks 78 and 80 should be of the ratio of one to one. (The term "effective length" is used herein in its conventional sense, i.e. to designate the physical dimension between the axis of rotation of the pivot axle of the respective bell cranks and the point of connection to the control arm, or wheel arm, thereof at which external torque is applied.)

It is seen in FIGURE 2 that the wheel linkage is supplied with toggle 96 and that the clevis end 98 of tie rod 100 interconnects a medial point of toggle 96 with control arm 84 of bell crank 76. (Securement of tie rods 100 and 106 and link 104 is made by the usual pins 102.)

Rigid means in the form of a link 104 pivotally interconnects control arm 88 of bell crank 78 with the lower end of toggle 96. Tie rod 106 intercouples at its clevised ends 108 and 110 the remaining end of toggle 96 and control arm 92 of bell crank 80 via self-contained, shock absorber spring means 109. (Spring means 109 is directly connected by clevis connection 110 and pin 112 to control arm 92, the spring means 109 being disposed between flanged housing cover 114 and the flanged end 116 of tie rod 106 in order to provide a compression spring type of resiliency in the tie rod 106.)

As indicated in FIGURE 2A, the tie rod 100 may also self-contain the spring means 109 instead of tie rod 106, as desired. Or, alternatively, both of the tie rods may include a resilient spring means for the system. Less desired is the situation where the spring means is deleted from the system altogether.

A plurality of wheel axles 118 are secured to the several bell cranks and have journalled thereon wheels 120.

The necessitation for the right-angle relationship of the control arms and wheel arms of the several bell cranks will now become apparent. Reference is now made to FIGURE 6 wherein it will be seen that if it is assumed that $Y'$ designates the effective length of the control arm (of any particular bell crank) and $Y$ the effective length of the wheel arm and, further, if $X'$ designates the moment arm of the control arm and $X$ the moment arm of the wheel arm when, through wheel impart, for example, the bell crank has been displaced and angle $\theta$, then $Y':X$ as $Y:X$, and $F/W$ equals a constant (the magnitude of which depends upon the ratio of the effective lengths of the two arms). This means that slight displacements from the horizontal of the wheel arm of a particular bell crank will result in a shortening of the effective moment arm of this wheel arm so as to reduce the torque thereof imposed upon the bell crank. However, this effect is accompanied by an effective shortening of the moment arm produced by the control arm of the bell crank so that the ratio of arm load to wheel load will remain constant and thus be independent of angular displacement of the bell crank. The above holds true for all ratios of effective lengths of the control arm to the wheel arm.

That the constant ratio of arm load $F$ to wheel load $W$ is preserved for all values of displacement $\theta$ enables the linkage system interconnecting the three wheel axles (on one side) to react to tendencies to instantaneous increases in wheel load at any one wheel, as through bump impact, for example, in adjusting wheel orientation of the entire side involved so that the increase in loading is divided among all by the action of the linkage and other wheels. Thus, wheel load remains equal at each wheel, at one side, and uniform for all conditions of travel. Peak wheel loads are avoided, and ramp and other incline travel is accommodated so that wheel loads will remain equal and constant irrespective of the slope involved or the direction of travel.

The ratio of effective lengths of control arm 84 to wheel arm 86 is preferably chosen to be 1:2. This results in the associated wheel balancing the other two (of the side involved). Further, any increase $\Delta W$ in wheel load $W$ at the front wheel (associated with bell crank 76) will be multiplied by two at tie rod 100 which ($2\Delta W$) will be divided equally among the medial and rear wheels 120. This follows since the ratios of the effective lengths of control arm to wheel arm of the bell cranks 78 and 80 are specifically chosen to be 1:1 (where link 96 is fulcrumed at its center). The same analysis may be applied where an increase $\Delta W$ in wheel load $W$ occurs at the medial or rear bell cranks 78, 80.

FIGURE 6A indicates that the system is stabilized, i.e. link 96 is maintained in a state of equipoise, when the load 100F of tie rod 100 is equal to the sum of loads 106F and 104F of tie rod 106 and link 104, respectively, and where loads 106F and 104F are equal in magnitude and direction and link 96 is fulcrumed at its center. (This follows from a vector addition of the forces and torques involved in FIGURE 6A. Thus $$100F = 106F + 104F$$
$$100F(L/2) = 106F(L)$$

where $L$ is the effective length of link 96.)

Where link 96 is fulcrumed off-center, then $$100F = 106F + 104F$$

but $$106F \neq 104F$$

and so the ratio of effective control arm to effective wheel arm of bell crank 78 and 80 would have to be adjusted accordingly, so that their axle loads would be equal to load $W + \Delta W$ at the front axle (associated with bell crank 76).

It is to be noted that the above theoretical treatment has neglected the slight deviation in tie rod 100 from the horizontal. However, detrimental effects will not occur, it is believed, where such deviation is held to 30° or less.

If desired, limit stop means S engaging the bell crank control arms may be used to prevent the arms of the several bell cranks from swinging beyond center so as to toggle, from which position they would not return by themselves.

Applying the principles above set forth it will be seen that if the forward wheel (associated with bell crank 76) starts up an incline, it will pivot its associated wheel arm 86 counterclockwise, simultaneously pivoting the associated control arm therewith an equal amount. This motion will then be transmitted through tie rod 100, toggle 96 and link 104 to the second control arm 88 and, simultaneously, from toggle 96 through the tie rod 106 and spring means 109 to the rear control arm 92. This produces a counter-clockwise pivoted displacement of bell cranks 78 and 80 which raises the frame A at the medial and rear wheels and maintains the frame substantially level, with the effective load on each wheel remaining constant.

If the forward wheel passes over a rise in the terrain and then returns to normal, then the second or middle wheel will pass over the rise, whereupon the movement of wheel carrier arm 90 will be in a clockwise direction as will the associated control arm 88. The clockwise movement of the arm 90 pivots the lower end of toggle 96 in a counter-clockwise direction about its center pivotal connection with the tie rod 100, increasing the load of tie rod 100 and transmitting motion through tie rod 106 to control arm 92 whereby the latter and its associated wheel arm 94 will also pivot in a counter-clockwise direction, lowering its axle 30. Inasmuch as there is an axle for each wheel with the axles for each set of wheels being in transverse alignment, it will be seen that if the wheels on one side pass over rough terrain while others remain level or pass over different contours, the transverse I-beams 22 and 24 function as interconnecting levers for transmission of motion; however, thrust on one axle is not transmitted to the corresponding axle.

It is apparent from the above discussion and from the drawings, particularly FIGURE 2, that the bell cranks 76, 78, 80, the rigid means or links 104, the toggles 96, and the first and second pairs of elongate tie rod means 106 and 100 are so constructed and arranged with respect to each other that the weight of the frame 22 when supported by the wheels 120 effects a balancing of forces exerted upon said toggles by the rigid means 104 and the first and second pairs of tie rod means 106 and 100 to hold the toggles 96 in states of equipoise. This is to say, the action of the medial and rear wheels 120, both at rest and in travel, so that the suspension system need not and, in fact, must not be tied in any way to the frame 22 save at pivot axle journals for the respective bell cranks. Such independence from the frame enables the wheels to cooperatively accommodate appreciably irregular terrain without varying the proportionately equal loading upon the several wheels, and thus avoids restriction as to pivotal movements of the wheels about their respective pivot axles which would otherwise destroy the innate character of the system to achieve the wheel-load balanced distribution desired.

From the foregoing it becomes apparent that the three wheels on each side of the trailer act simultaneously but independently thus providing a three-point support for the trailer, namely, the fifth wheel (not shown) on the tractor and the wheels to each side of the trailer.

The terms "front" and "rear" as applied to the wheels and bell cranks of the structure are not to be construed as limiting the structure since, obviously, the reverse end of the frame with its wheels and bell cranks may also be construed as or used as the "front" end, or "rear" end, as desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A trailer frame having a central, longitudinal axis; and in combination therewith, a three wheel-axis suspension system comprising a pair of independent sets of bell cranks respectively disposed on opposite sides of said longitudinal axis of said frame, each set comprising front, medial, and rear bell cranks, and each bell crank comprising a pivot axle, a wheel arm, and a control arm, said wheel arm and said control arm of each bell crank being disposed in 90° relationship with respect to each other; a plurality of means secured to said frame and engaging said bell crank pivot axles for journaling said pivot axles to said frame; six wheel axles respectively secured to respective ones of said bell crank wheel arms at points removed from their respective pivot axles; a plurality of wheels mounted upon said wheel axles; a pair of toggles; a pair of rigid means respectively intercoupling one end of respective ones of said toggles with the control arms of respective ones of said medially disposed bell cranks; a first pair of elongate tie rod means each respectively intercoupling the remaining ends of said toggles with the control arms of respective ones of said rear bell cranks; and a second pair of elongate tie rod means each respectively intercoupling said control arms of respective ones of said front bell cranks with respective ones of said toggles at respective, medial pivot points thereof, said bell cranks, rigid means, toggles, and first and second pairs of elongate tie rod means being so constructed and arranged with respect to each other that the weight of said frame when supported by said wheels effects a balancing of forces exerted upon said toggles by said rigid means and said first and second pairs of tie rod means to hold said toggles in states of equipoise, said suspension system, except for bell crank journaling to said frame at said pivot axles, being free from said frame, and wherein the ratio of the effective length of said control arm to the effective length of said wheel arm, about the respective pivot axles, of each of the medial and rear bell cranks is 1:1, and the ratio of the effective length of said control arm to the effective length of said wheel arm, about the respective pivot axles, of each of said front bell cranks is 1:2, said medial pivot point of each of toggles lying midway between their end connections.

2. A trailer frame having a central, longitudinal axis; and in combination therewith, a three wheel-axis suspension system comprising a pair of independent sets of bell cranks respectively disposed on opposite sides of said longitudinal axis of said frame, each set comprising front, medial, and rear bell cranks, and each bell crank comprising a pivot axle, a wheel arm, and a control arm, said wheel arm and said control arm of each bell crank being disposed in 90° relationship with respect to each other; a plurality of means secured to said frame and engaging said bell crank pivot axles for journaling said pivot axles to said frame; six wheel axles respectively secured to respective ones of said bell crank wheel arms at points removed from their respective pivot axles; a plurality of wheels mounted upon said wheel axles; a pair of toggles; a pair of rigid means respectively intercoupling one end of respective ones of said toggles with the control arms of respective ones of said medially disposed bell cranks; a first pair of elongate tie rods means each respectively intercoupling the remaining ends of said toggles with the control arms of respective ones of said rear bell cranks; and a second pair of elongate tie rod means each respectively intercoupling said control arms of respective ones of said front bell cranks with respective ones of said toggles at respective, medial pivot points thereof, said bell cranks, rigid means, toggles, and first and second pairs of elongate tie rod means being so constructed and arranged with respect to each other that the weight of said frame when supported by said wheels effects a balancing of forces exerted upon said toggles by said rigid means and said first and second pairs of tie rod means to hold said toggles in states of equipoise, said suspension system, except for bell crank journaling to said frame at said pivot axles, being free from said frame, and wherein at least one of said elongate tie rod means on each side of said frame includes resilient, shock absorber means.

3. A trailer frame having a central, longitudinal axis; and in combination therewith, a three wheel-axis suspension system comprising a pair of independent sets of bell cranks respectively disposed on opposite sides of said longitudinal axis of said frame, each set comprising front, medial, and rear bell cranks, and each bell crank comprising a pivot axle, a wheel arm, and a control arm, said wheel arm and said control arm of each bell crank being disposed in 90° relationship with respect to each other; a plurality of means secured to said frame and engaging said bell crank pivot axles for journaling said pivot axles to said frame; six wheel axles respectively secured to respective ones of said bell crank wheel arms at points removed from their respective pivot axles; a plurality of wheels mounted upon said wheel axles; a pair of toggles; a pair of rigid means respectively intercoupling one end of respective ones of said toggles with the control arms of respective ones of said medially disposed bell cranks; a first pair of elongate tie rod means each respectively intercoupling the remaining ends of said toggles with the control arms of respective ones of said rear bell cranks; and a second pair of elongate tie rod means each respectively intercoupling said control arms of respective ones of said front bell cranks with respective ones of said toggles at respective, medial pivot points thereof, said bell cranks, rigid means, toggles, and first and second pairs of elongate tie rod means being so constructed and arranged with respect to each other that the weight of said frame when supported by said wheels effects a balancing of forces exerted upon said toggles by said rigid means and said first and second pairs of tie rod means to hold said toggles in states of equipoise, said suspension system, except for bell crank journaling to said frame at said pivot axles, being free from said frame, and wherein the ratio of the effective length of said control arm to the effective length of said wheel arm, about the respective pivot axle, of each of said front bell cranks is 1:2, said medial and rear bell cranks, elongate tie rod means, toggles, rigid means on each side of said frame and medial and rear bell cranks being so proportioned as to constitute means for transmitting and for dividing equally forces of pull of said second elongate tie rods means between the wheel axles of said medial bell cranks and the wheel axles of said rear bell cranks, respectively.

4. A trailer frame having a central, longitudinal axis; and in combination therewith, a three wheel-axis suspension system comprising a pair of independent sets of bell cranks respectively disposed on opposite sides of said longitudinal axis of said frame, each set comprising front, medial, and rear bell cranks, and each bell crank comprising a pivot axle, a wheel arm, and a control arm, said wheel arm and said control arm of each bell crank being disposed in 90° relationship with respect to each other; a plurality of means secured to said frame and engaging said bell crank pivot axles for journaling said pivot axles to said frame; six wheel axles respectively secured to respective ones of said bell crank wheel arms at points removed from their respective pivot axles; a plurality of wheels mounted upon said wheel axles; a pair of toggles; a pair of rigid means respectively intercoupling one end of respective ones of said toggles with the control arms of respective ones of said medially disposed bell cranks; a first pair of elongate tie rod means each respectively intercoupling the remaining ends of said toggles with the control arms of respective ones of said rear bell cranks; and a second pair of elongate tie rod means each respectively intercoupling said control arms of respective ones of said front bell cranks with respective ones of said toggles at respective, medial pivot points thereof, said bell cranks, rigid means, toggles, and first and second pairs of elongate tie rod means being so constructed and arranged with respect to each other that the weight of said frame when supported by said wheels effects a balancing of forces exerted upon said toggles by said rigid means and said first and second pairs of tie rod means to hold said toggles in states of equipoise, said suspension system, except for bell crank journaling to said frame at said pivot axles, being free from said frame, and wherein the ratio of the effective length of said control arm to the effective length of said wheel arm, about the respective pivot axle, of each of said front bell cranks is 1:2, said elongate tie rod means toggles, rigid means, and medial and rear bell cranks on each side of said frame being so proportioned as to constitute means for equalizing wheel load at the several wheel axles on each side of said frame, respectively.

References Cited in the file of this patent

UNITED STATES PATENTS

| | | |
|---|---|---|
| 1,894,776 | Liang | Jan. 17, 1933 |
| 2,308,331 | Heaslet | Jan. 12, 1943 |
| 2,398,248 | Reid | Apr. 9, 1946 |
| 2,920,903 | Locker | Jan. 12, 1960 |

FOREIGN PATENTS

| | | |
|---|---|---|
| 921,305 | Germany | Dec. 13, 1954 |